United States Patent [19]
Ko

[11] Patent Number: 6,102,490
[45] Date of Patent: Aug. 15, 2000

[54] BRAKING SYSTEM OF AN AUTOMOBILE HAVING A VARIABLY EXHAUSTING PUMP UNIT

[75] Inventor: Chang-Bok Ko, Namyangju, Rep. of Korea

[73] Assignee: Mando Machinery Corporation, Gunpo, Rep. of Korea

[21] Appl. No.: 08/971,575

[22] Filed: Nov. 17, 1997

[30] Foreign Application Priority Data

Dec. 17, 1996 [KR] Rep. of Korea ............. 96-66751

[51] Int. Cl.[7] ............................................. B60T 13/16
[52] U.S. Cl. ................................... 303/10; 417/222.1
[58] Field of Search ..................... 303/10, 11, 116.2, 303/116.1, 116.4, DIG. 1, DIG. 2; 417/222.1, 269; 92/71

[56] References Cited

U.S. PATENT DOCUMENTS

| | | | |
|---|---|---|---|
| Re. 31,711 | 10/1984 | Horiuchi | 417/222.1 |
| 2,040,390 | 5/1936 | Loe | 73/244 |
| 5,711,582 | 1/1998 | Koike | 303/11 |
| 5,722,744 | 3/1998 | Kupfer et al. | 303/189 |
| 5,882,089 | 3/1999 | Nakamura et al. | 303/10 |

*Primary Examiner*—Matthew C. Graham
*Assistant Examiner*—Melanie Talavera
*Attorney, Agent, or Firm*—Staas & Halsey

[57] ABSTRACT

Disclosed is a braking system of an automobile, which can produce and store an electric power by means of the energy generated when the automobile is braked, thereby increasing efficiency in energy use, and simultaneously which can perform an anti-lock braking function and a traction control function. In the braking system, a master cylinder generates a hydraulic pressure when the brake pedal is pressed. A variably exhausting pump unit performs a pumping operation by the hydraulic pressure from the master cylinder. A control section senses a traveling state of the automobile and controls so that a proper braking force is applied to a wheel of the automobile. A flow control valve providing the variably exhausting pump unit with the braking force. A generating section generates electricity by means of a bypassed hydraulic pressure according to the order of the control section.

14 Claims, 6 Drawing Sheets

6,102,490

BRAKING SYSTEM OF AN AUTOMOBILE HAVING A VARIABLY EXHAUSTING PUMP UNIT

BACKGROUND OF THE INVENTION

1. Field of the Invention

The present invention relates to a braking system of an automobile, and more particularly to a braking system having a variably exhausting pump unit which enables the braking system not only to perform a braking function but to utilize the energy of hydraulic pressure which is generated during the braking and which may be lost without the unit.

2. The Prior Arts

It is well-known in the art that a brake is a system for stopping or decelerating an automobile being driven. The brake system performs the braking function in such a manner that it transforms the kinetic energy of a traveling automobile into a heat energy by means of a mechanical friction apparatus and radiates the frictional heat into the atmosphere.

Recently, the automobile is generally equipped with various systems for improving its traveling stability, such as an anti-lock braking system (ABS) and a traction control system (TCS). The ABS is a system for ensuring a strong and stable braking capability by properly controling the hydraulic pressure of the brake when the automobile is braked on slippery or uneven ground. The TCS is a system for preventing the driving wheels from slipping when the automobile is rapidly accelerated to start on slippery ground by applying proper braking pressure to the driving wheels even when the brake pedal is not stepped on.

FIG. 1 shows a schematic hydraulic circuit diagram of a conventional braking system. As shown, the conventional braking system includes a brake pedal 10 arranged under a driver's seat and connected to a master cylinder 11 which transfers an external force applied to the brake pedal 10. A brake booster 12 is arranged between the brake pedal 10 and the master cylinder 11 to boost the braking power. One end of a first fluid path 20 is connected to the master cylinder 11, while a first solenoid valve 30 for controling the flow of fluid is disposed at the other end of the first fluid path 20. The first solenoid valve 30 is connected to a second fluid path 21 which extends up to a braking section 70 and is connected through a second solenoid valve 31 to a third fluid path 22 branching off from the first fluid path 20. A pump 41 driven by a motor 40, a check valve 50, and a tank 90 are provided between the third fluid path 22 and the second solenoid valve 31. A speed sensor 81 for sensing the braked state of a wheel 60 is provided in the braking section 70, and the conventional braking system further includes an electronic control unit (ECU) 80 which controls the first solenoid valve 30, the second solenoid valve 31, and the motor 40, according to signals from the speed sensor 81.

In operating the conventional braking system as described above, when a driver steps on the brake pedal 10, the master cylinder 11 generates a hydraulic pressure, which is transferred through the first solenoid valve 30 to the braking section 70 The hydraulic pressure enables a piston installed in a caliper 62 to push a pad toward a disc 61, thereby performing the braking function (see FIG. 2). In this case, the fluid or oil supplied from the master cylinder 11 through the first fluid path 20 to the third fluid path 22 is interrupted by the check valve 50, and the second solenoid valve 31 also is blocked off. Therefore, the oil is not supplied through the second fluid path 21.

While the braking force is being applied to the wheel 60, the speed sensor 81 disposed at one side of the wheel 60 senses if the wheel 60 slips. When a slip of the wheel 60 is sensed by the speed sensor 81, the ECU 80 closes the first solenoid valve 30 to interrupt the supply of oil into the braking section 70, opening the second solenoid valve 31 to make the oil having been supplied in the braking section 70 be retrieved into the tank 90 through the second fluid path 21 and the second solenoid valve 31, thereby decreasing the braking force applied to the wheel 60.

The decrease of braking force by the above process eliminates the slip of the wheel 60, and then the speed sensor 81 again senses the elimination of slip of the wheel 60 and reports it to the ECU 80. According to the signals from the speed sensor 81, the ECU 80 opens the first solenoid valve 30, closes the second solenoid valve 31, and at the same time orders the operation of the motor 40. Then, the pump 41 pumps the oil in the tank 90 to supply the braking section 70 through the third fluid path 22 and the first solenoid valve 30, thereby performing the braking operation. By repeating the process as above, the ABS performs its function. The reference numeral 100 not described above designates the differential gear.

FIG. 2 schematically shows an entire construction of a disc brake employed in the conventional braking system, referring to which the operation of the disc brake will be described hereinbelow.

When a driver steps on the brake pedal 10, the hydraulic pressure generated by the master cylinder 11 is transferred through an introduction port 121 to a cylinder 120. This hydraulic pressure makes a piston 130 compress an inner pad 140 against a disc 160 in an instant, and at the same time the hydraulic pressure remaining in the cylinder 120 makes caliper 110 move rightward by means of a sliding member (not shown), so as to compress an outer pad 150 against the disc 160, thereby performing the braking function. When the brake pedal 10 is released, the piston 130 is restored to its original position due to the elastic force of a seal within groove 131. Then, the disc 160, the inner pad 140, and the outer pad 150 are spaced again at a predetermined distance.

However, in the conventional braking system described above, the heat energy produced by the friction between the disc and the pads in the course of braking the car is discharged untouched into the atmosphere to disappear, which is not an efficient use of energy. Further, the frictional heat shortens the life of the elements in the braking system.

Moreover, the conventional braking system is also problematic in that its construction is very complicated because it requires individual systems for performing an anti-lock braking function and a traction control function, respectively.

SUMMARY OF THE INVENTION

The present invention overcomes the above described problems of the prior art, and accordingly it is an object of the present invention to provide a braking system of automobile, which can produce and store an electric power by means of the energy generated when the automobile is braked, thereby increasing efficiency in energy use, and simultaneously which can perform an anti-lock braking function and a traction control function.

To achieve the above object, the present invention provides a braking system of an automobile having a variably exhausting pump unit, the braking system comprising:

a brake pedal arranged in a driver's seat;

a master cylinder for generating a hydraulic pressure when a force applied to the brake pedal is received;

a variably exhausting pump unit for performing a pumping operation by the master cylinder; and a control section for sensing a traveling state of the automobile and controling so that a proper braking force is applied to a wheel of the automobile.

BRIEF DESCRIPTION OF THE DRAWINGS

The above object, and other features and advantages of the present invention will become more apparent by describing preferred embodiments thereof in detail with reference to the attached drawings, in which.

DESCRIPTION OF THE PREFERRED EMBODIMENTS

Hereinafter, a preferred embodiment of the present invention will be described in detail with reference to the accompanying drawings, and like elements will be numbered the same in the following description.

Figure 1:
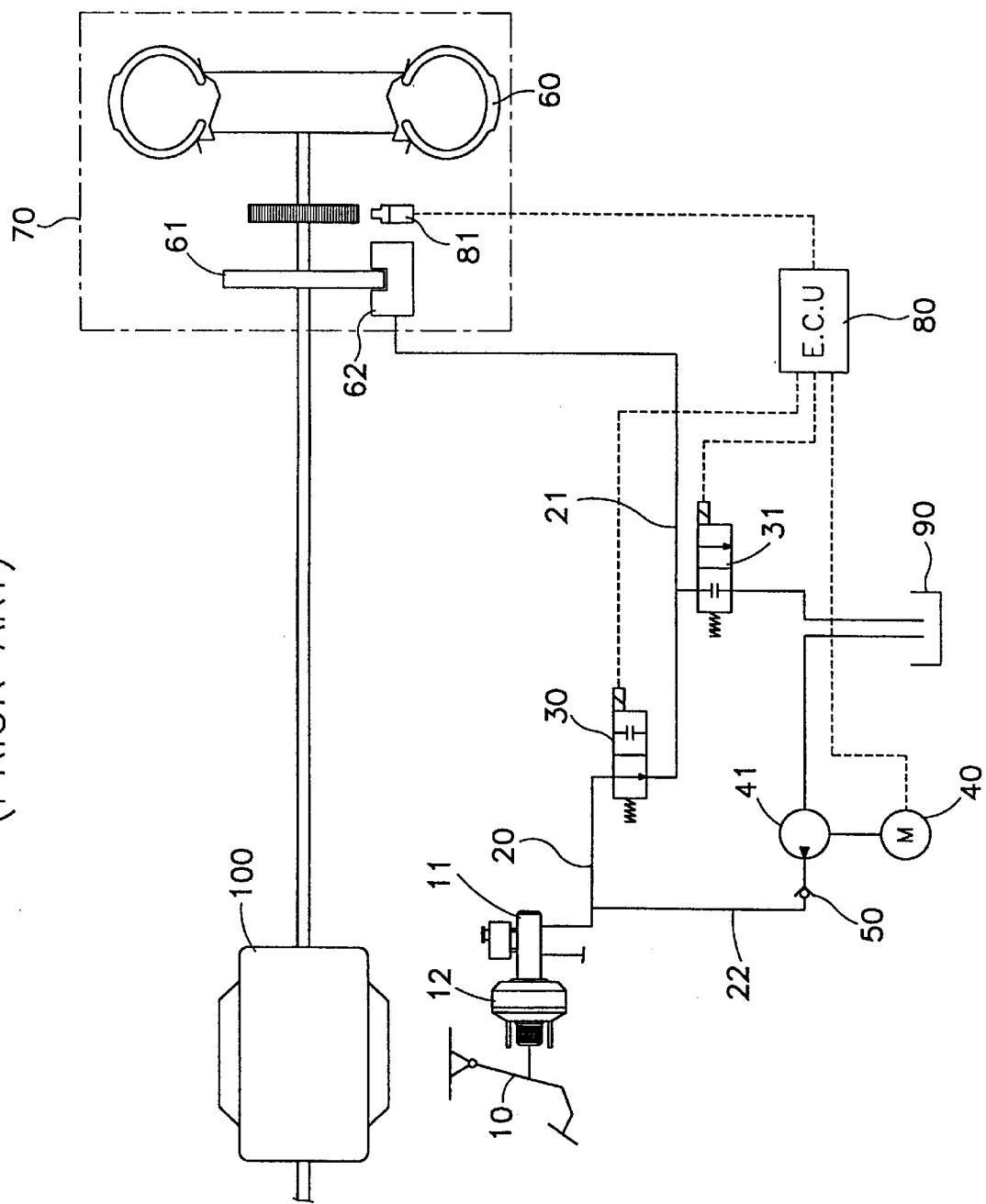
FIG. 1 is a schematic hydraulic circuit diagram of a conventional braking system.
Figure 2:
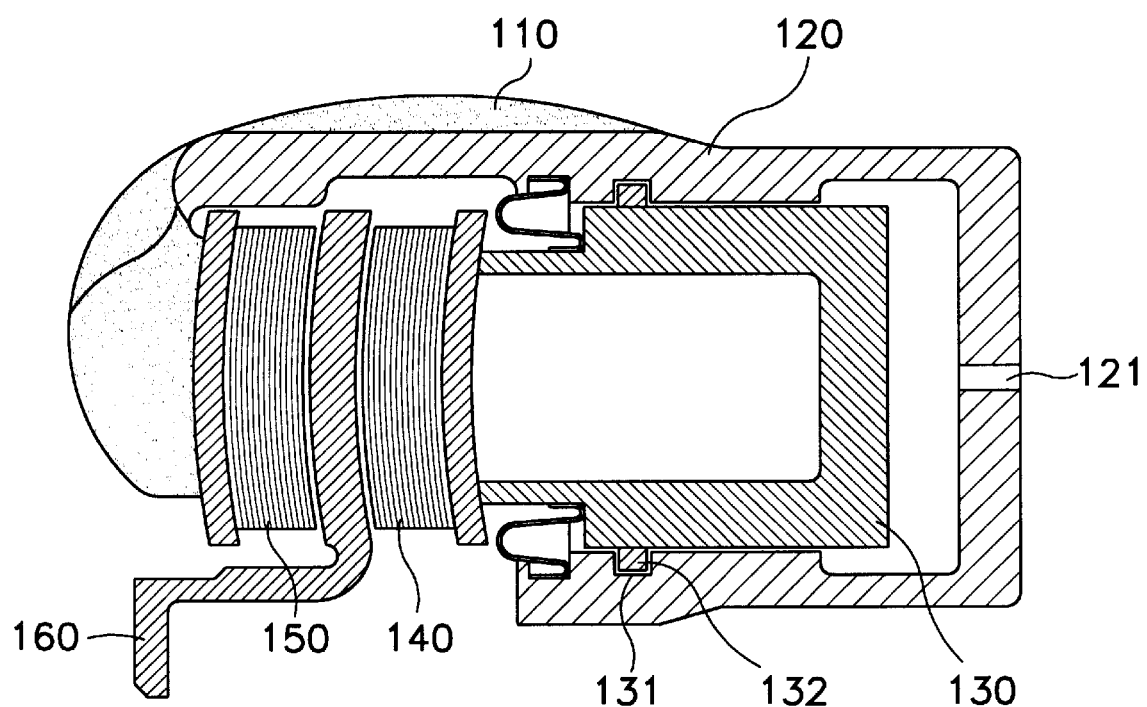
FIG. 2 is a schematic sectional view of a disc brake employed in the braking system shown in FIG. 1.
Figure 3:
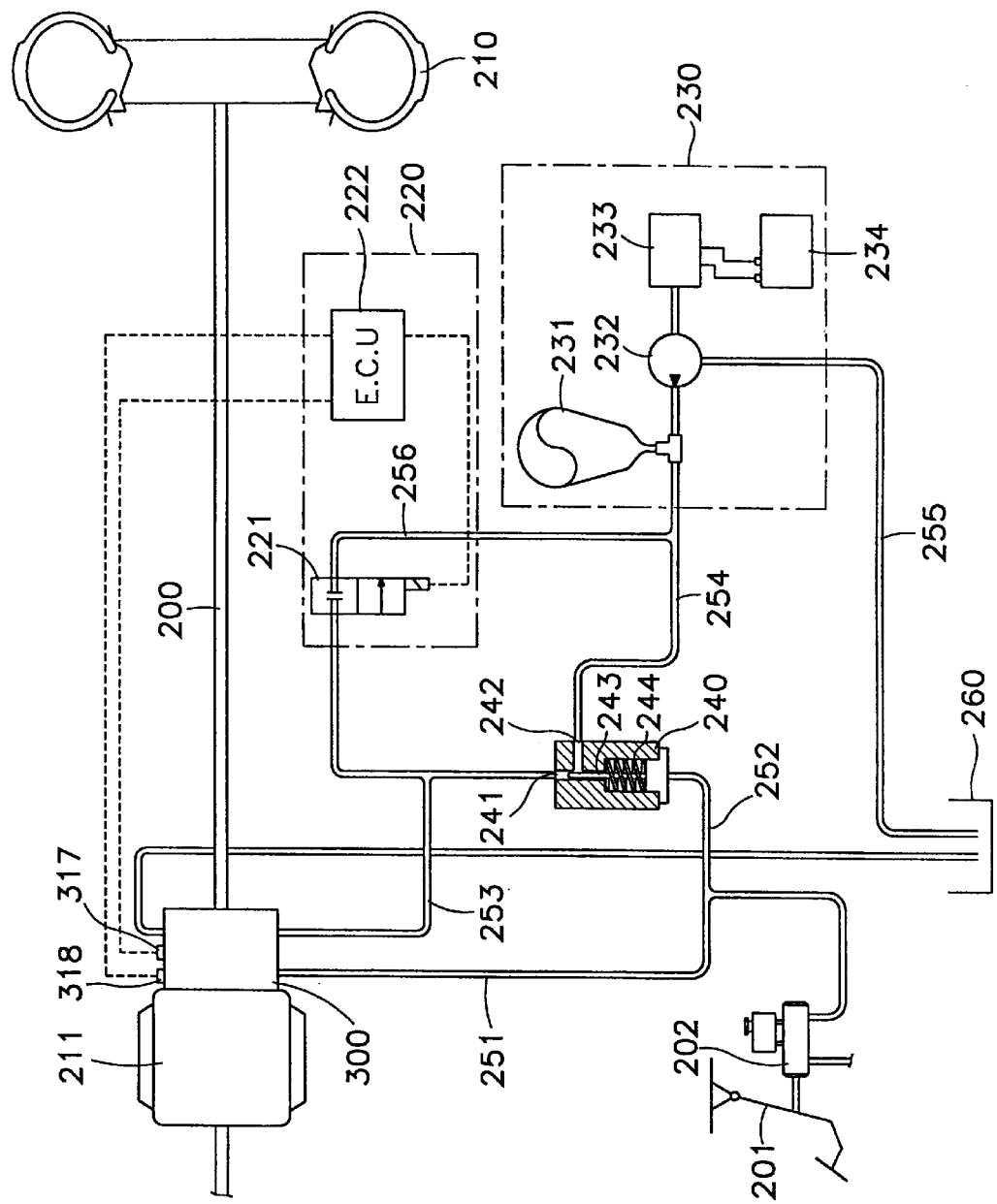
FIG. 3 is a schematic hydraulic circuit diagram a braking system having a variably exhausting pump unit according to the present invention.
Figure 4:
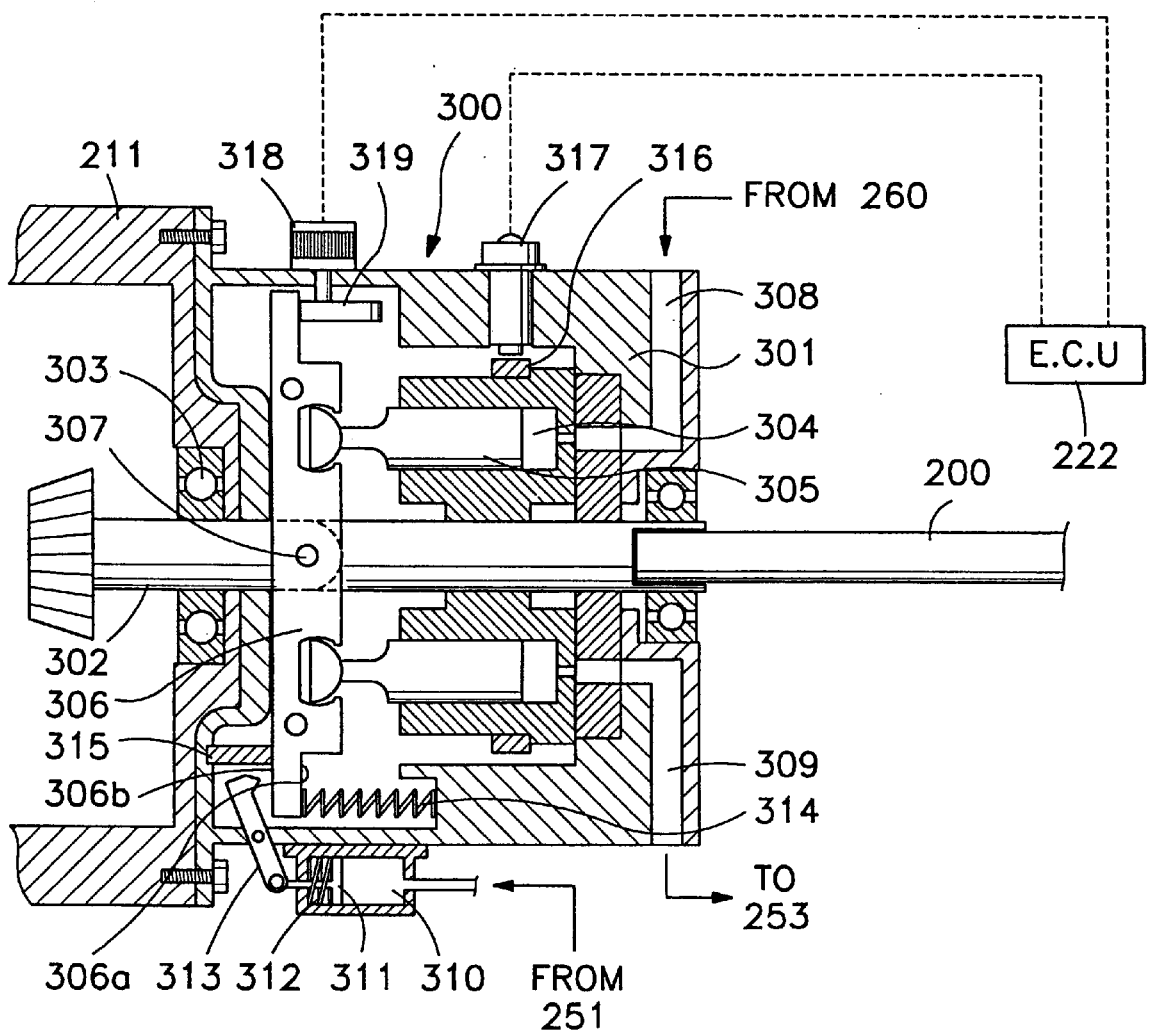
FIG. 4 is a sectional view of the variably exhausting pump unit in FIG. 3, showing its operation when the automobile travels under normal conditions.

FIG. 3 is a schematic hydraulic circuit diagram of a braking system having a variably exhausting pump unit according to the present invention, and FIG. 4 is a sectional view of the variably exhausting pump unit in FIG. 3, showing its operation when the automobile travels under normal conditions.

As shown in FIGS. 3 and 4, the braking system according to the present invention includes a master cylinder 202, a variably exhausting pump unit 300, a control section 220, a flow control valve 240, and a generating section 230. The master cylinder 202 generates a hydraulic pressure when a force applied to a brake pedal 201 is transferred thereto. The variably exhausting pump unit 300 brakes a wheel 210 with pumping oil at high pressure. The control section 220 senses the traveling state of the automobile and applies a proper braking force to the wheel 210. The flow control valve 240 makes a reverse torque be produced in the variably exhausting pump unit 300. The generating section 230 generates electricity by means of the hydraulic pressure applied when the automobile is braked.

The hydraulic pressure generated at the master cylinder 202 and transferred through the first fluid path 251 makes a swash plate 306 be slanted, and the rotation of the slanted swash plate 306 enables the variably exhausting pump unit 300 to exhaust at high pressure the fluid introduced from a tank 260. In this case, the high pressure of this exhausted fluid is maintained between the flow control valve 240 and a solenoid valve 221, and then it applies a reverse torque to the variably exhausting pump unit 300, which reverse torque functions as a braking force for the wheel 210.

The control section 220 includes an electronic control unit (ECU) 222 for giving orders based on slip signals of the wheel transferred from a ring sensor 316 and a sensor 317 installed in the variably exhausting pump unit 300, and a normal close-type solenoid valve 221 which is opened and closed corresponding to the orders from the ECU 222.

The flow control valve 240 has a piston 243 elastically supported by a spring 244 and is connected to a second fluid path 252 branched off from the first fluid path 251. An introduction port 241 and an exhaust port 242 are defined in the flow control valve 240. The introduction port 241 is connected to a third fluid path 253 connected to the solenoid valve 221, and the exhaust port 242 is connected to a fourth fluid path 254 from which a bypass tube 256 connected to the solenoid valve 221 is branched off.

The generating section 230 includes an accumulator 231 connected to the fourth fluid path 254, a pump 232 operated by a hydraulic pressure transferred from the accumulator 231, a generator 233 for generating electricity by means of the driving force of the pump 232, and a battery 234 for storing the electricity. The pump 232 is connected through a fifth fluid path 255 to the tank 260, so that the fluid having been used for driving the pump 232 is introduced into the tank 260.

Hereinafter, the construction of a variably exhausting pump unit employed in the braking system as above will be described in detail with reference to FIG. 4.

The variably exhausting pump unit 300 includes a rotation shaft 302 extending through the middle of a body 301, one end of which is connected to a differential gear 211, and the other end of which is connected to a driving shaft 200 cooperating with the wheel 210 (see FIG. 3). The rotation shaft 302 is supported by a bearing 303, and a plurality of hydraulic cylinders 304 and hydraulic pistons 305 are fixed to the outer peripheral surface of the rotation shaft 302. Further, the swash plate 306 for supporting the hydraulic piston 305 movably in the longitudinal direction is fixed to the rotation shaft 302 by a shaft pin 307.

At the exterior of the body 301, there are provided a lever cylinder 310 connected to the master cylinder 202 (see FIG. 3), a lever piston 311 arranged in the lever cylinder 310, and a first spring 312 for applying an elastic force to the lever piston 311 against the hydraulic pressure transferred to the lever cylinder 310. Further, one end of the lever piston 311 is connected to a lever 313 which is in contact with a rear surface 306b of the swash plate 306. The lever 313 applies an external force to the swash plate 306 by the operation of the lever piston 311, to thereby make the swash plate 306 be slanted about the shaft pin 307. In addition, a second spring 314 is inserted between the body 301 and a front surface 306a of the swash plate 306 so as to oppose the external force by the lever 313, and a stopper 315 for limiting the movement of the swash plate 306 by the elastic force of the second spring 314 is disposed in front of the rear surface 306b of the swash plate 306.

The ring sensor 316 and the sensor 317 for sensing a slide of the wheel are disposed respectively at the exterior of the hydraulic cylinder 304 and the variably exhausting pump unit 300. They transmits electric signals to the ECU 222 corresponding to the slide of the wheel.

Meanwhile, a stepped motor 318 driven according to the electric signal of the ECU 222 is arranged at the exterior of the body 301, and the shaft of the stepped motor 318 is connected to a cam 319 which is in sliding contact with an end of the swash plate 306.

Referring to FIGS. 3 and 4, the operation of the braking system constructed as above according to the present invention will be described hereinafter.

When the automobile travels under a normal condition, that is, in a state where the brake pedal 201 is not stepped on, the rotation shaft 302 connected to the differential gear 211 rotates according to the driving of the automobile, and accordingly the swash plate 306 assembled with the rotation shaft 302 by the shaft pin 307 also rotates. In this case, the rear surface 306b of the swash plate 306 comes into a close contact with the stopper 315 by the elastic force of the second spring 314, so that the swash plate 306 crosses the rotation shaft 302 at a right angle. In other words, the swash plate 306 rotates without being slanted, and hence the hydraulic piston 305 fixed to the swash plate 306 performs no operation in the hydraulic cylinder 304. Therefore, the rotation shaft 302 rotates without resistance to transfer the driving force of the automobile to the wheel 210.

Figure 5:
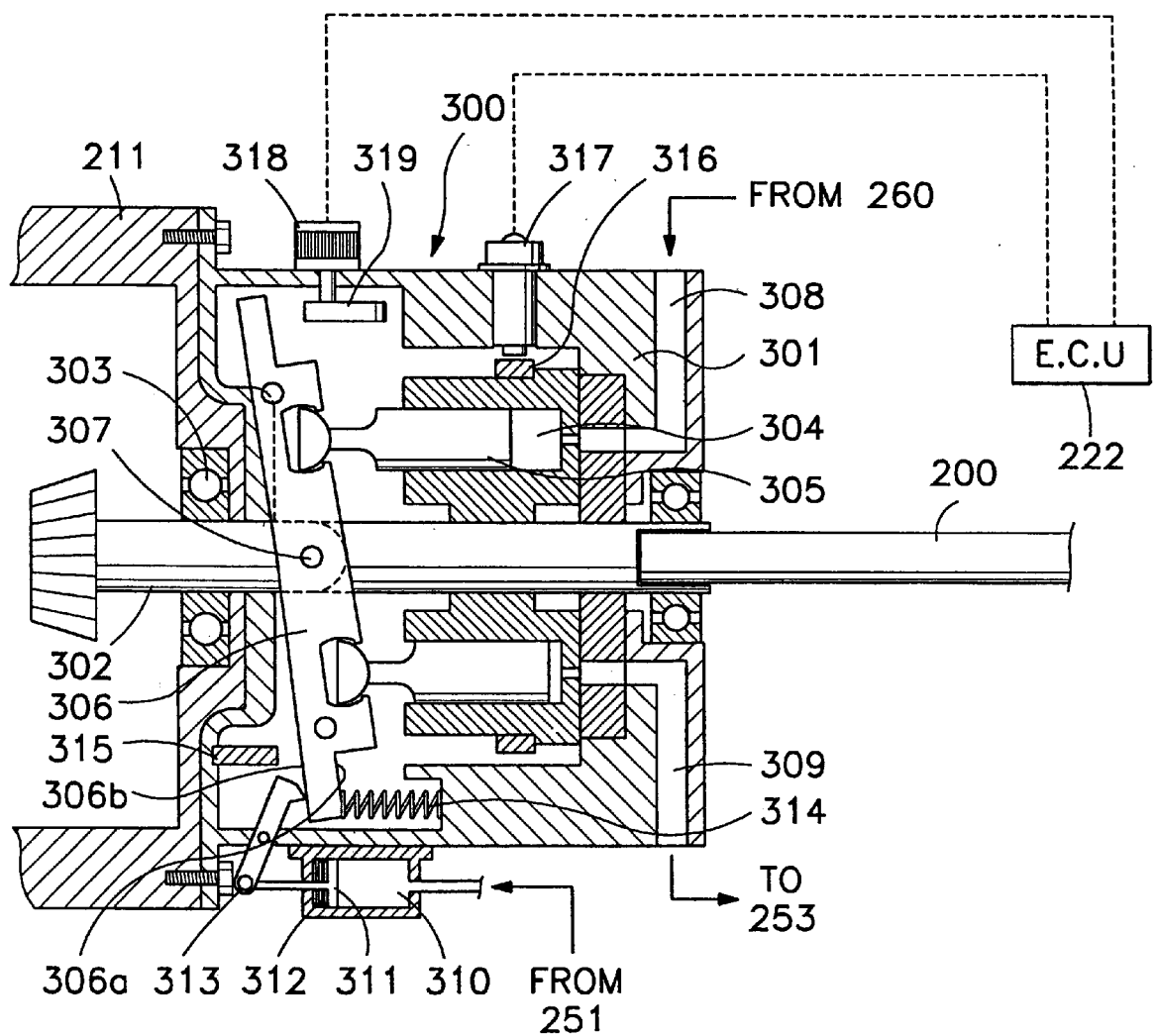
FIG. 5 is a sectional view similar to FIG. 4, showing the operation of the variably exhausting pump unit when the automobile is braked.

FIG. 5 is a sectional view for showing the operation of the variably exhausting pump unit when the automobile is braked.

When the brake pedal 201 is stepped on for braking operation, the hydraulic pressure generated in the master cylinder 202 is transferred through the first fluid path 251 to the lever cylinder 310 so as to operate the lever piston 311. Then, the lever 313 connected to the lever piston 311 applies a force larger than the elastic force of the second spring 314 to the swash plate 306, so as to make the swash plate 306 be slanted counterclockwise about the shaft pin 307.

When this slanted swash plate 306 rotates together with the rotation shaft 302, the hydraulic piston 305 performs a linear alternating movement in the hydraulic cylinder 304, so that the oil introduced in the hydraulic cylinder 304 through an introduction path 308 is exhausted into the third fluid path 253 through an exhaust path 309. In this case, the flow control valve 240 is closed by the hydraulic pressure transferred through the second fluid path 252 from the master cylinder 202 and the solenoid valve 221 also is closed, and thereby the third fluid path 253 is blocked off, so that the hydraulic pressure transferred to the third fluid path 253 gradually increases. This increase of the hydraulic pressure in the closed third fluid path 253 produces a reverse torque preventing the rotation of the rotation shaft 302, which results in the braking force to the wheel 210.

In the meantime, when the wheel 210 slips due to an exceeding braking force applied to the wheel 210 or due to change of conditions of the ground, the ring sensor 316 and the sensor 317 sense the slip and transmits a corresponding electric signal to the ECU 222. Accordingly, the ECU 222 opens the normal close type solenoid valve 221, so that the hydraulic pressure in the third fluid path 253 is bypassed through the open solenoid valve and bypass tube 221 and 256 to the fourth fluid path 254 and then transferred to the generating section 230. In result, the reverse torque for preventing the rotation of the rotation shaft 302 decreases, and the braking force to the wheel 210 decreases accordingly.

As described above, when the hydraulic pressure in the third fluid path 253 is discharged and hence the braking force decreases due to the opening of the solenoid valve 221, and if the ECU 222 determines that a proper braking force is not being applied to the wheel 210, the ECU 222 closes again the solenoid valve 221 to generate the reverse torque for preventing the rotation of the rotation shaft 302 to thereby apply again the braking force to the wheel 210. Repetition of the above process enables the anti-lock braking.

When the hydraulic pressure in the third fluid path 253 is larger than that applied to the piston 243 of the flow control valve 240, the piston 243 of the flow control valve 240 is lowered down, so that the fluid in the third fluid path 253 flows through the introduction port 241 and the exhaust port 242 into the fourth fluid path 254. In this case, if the brake pedal 201 is pressed further, that is, if further force is applied to the brake pedal 201, the piston 243 elevates to block up the introduction port 241, thereby generating the repetitive braking force as described above.

When the external force having been applied to the brake pedal 201 is released so that the hydraulic pressure of the master cylinder 202 is released, the rear surface 306b of the swash plate 306 comes into close contact with the stopper 315 due to the elastic force of the second spring 314, and thereby the swash plate 306 crosses the rotation shaft 302 at a right angle. Therefore, the hydraulic piston 305 fixed to the swash plate 306 performs no operation in the hydraulic cylinder 304, and accordingly the rotation shaft 302 rotates without resistance to transfer the driving force of the automobile to the wheel 210.

Figure 6:
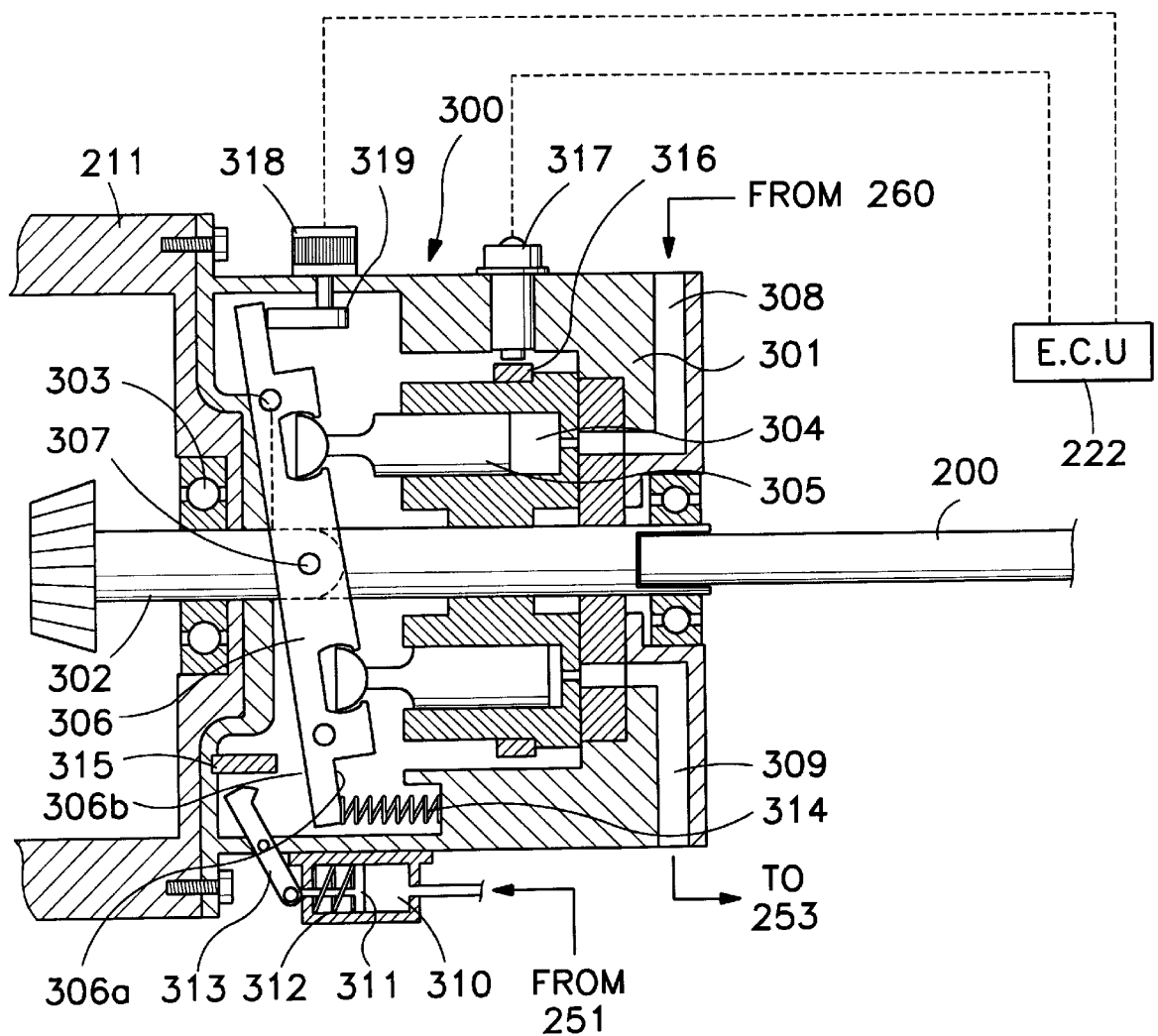
FIG. 6 is a sectional view similar to FIG. 4, showing the operation of the variably exhausting pump unit when the automobile performs the traction control function.

FIG. 6 is a sectional view showing the operation of the variably exhausting pump unit when the automobile performs the traction control function.

When the ring sensor 316 and the sensor 317 sense slide of a wheel which may happen in case the automobile starts or accelerates on a slippery ground, they transmit a corresponding electric signal to the ECU 222. According to the signal, the ECU 222 operates the stepped motor 318 disposed at an exterior of the body 301 to thereby rotate the cam 319, so that the swash plate 306 comes to be slanted counterclockwise about the shaft pin 307. When the slanted swash plate 306 rotates together with the rotation shaft 302, the hydraulic piston 305 performs a linear alternating movement in the hydraulic cylinder 304, SO that the oil introduced in the hydraulic cylinder 304 through the introduction path 308 is exhausted into the third fluid path 253 through the exhaust path 309. In this case, the third fluid path 253 is blocked off by the closed flow control valve and solenoid valves 240 and 221, so that the hydraulic pressure transferred to the third fluid path 253 gradually increases. This increase of the hydraulic pressure in the closed third fluid path 253 a produces a reverse torque preventing the rotation of the rotation shaft 302, which results in the braking force to the wheel 210. Through the above process, the traction control is performed.

In the course of the repetitive braking operation as above, when the fluid under high pressure is introduced through the fourth fluid path 254 into the accumulator 231, the accumulator 231 absorbs the high hydraulic pressure while transferring a predetermined hydraulic pressure to the pump 232 to thereby operate the pump 232. The pump 232 enables the generator 233 to generate electricity and store it in the battery 234 SO that it can be used when necessary.

The braking system according to the present invention employs a variably exhausting pump unit, as described above. Therefore, the braking system according to the present invention is very advantageous in that the energy generated in braking the automobile is not naturally exhausted but retrieved to be used for generating and storing electricity, which result in high efficiency in using energy.

Furthermore, the braking system can perform the anti-lock braking function and the traction control function by controling the hydraulic pressure of the pump unit. Therefore, the braking system according to the present invention has a further advantage that it does not require a brake booster and a disc brake device, which means its construction can be simplified and its size and weight can be reduced. Further to the above, the operational noise of the system can be greatly reduced.

While the present invention has been particularly shown and described with reference to the particular embodiment thereof, it will be understood by those skilled in the art that various changes in form and details may be effected therein without departing from the spirit and scope of the invention as defined by the appended claims.

What is claimed is:

1. A braking system of an automobile having a variably exhausting pump unit, the braking system comprising:

a brake pedal in the vicinity of a driver's seat;

a master cylinder for generating hydraulic pressure when a force applied to the brake pedal is received;

a variably exhausting pump unit for performing a pumping operation by the master cylinder, the variably exhausting pump unit comprising a body, an introduction port and an exhaust port defined in the body, a rotation shaft extending through a middle of the body, and a swash plate fixed to the rotation shaft;

a control section for sensing a traveling state of the automobile and controlling such that a proper braking force is applied to a wheel of the automobile;

a flow control valve for controlling the hydraulic pressure transferred from the variably exhausting pump unit so as to apply a reverse torque to the variably exhausting pump unit, thereby braking the wheel of the automobile; and wherein the rotation shaft has a first end connected to a differential gear of the automobile and a second end connected to a driving shaft following a rotation of the wheel, and a plurality of hydraulic cylinders and hydraulic pistons are fixed to an outer surface of the rotation shaft.

2. The braking system as claimed in claim 1, wherein the control section comprises an electronic control unit for determining a slip of the wheel and giving an order, and a solenoid valve for blocking and bypassing an oil exhausted from the variably exhausting pump unit according to the order from the electronic control unit.

3. The braking system as claimed in claim 2, wherein the solenoid valve is connected to an accumulator for receiving the hydraulic pressure bypassed from the solenoid valve, a pump driven by the hydraulic pressure transferred from the accumulator, a generator for generating electricity by a driving force of the pump, and a battery for storing the electricity generated by the generator.

4. The braking system as claimed in claim 1, wherein said swash plate is fixed to the rotation shaft by a shaft pin in such a manner that the swash plate is slanted based on the shaft pin as a reference point, the swash plate being rotatable together with the rotation shaft.

5. The braking system as in claim 4, wherein one end of the hydraulic pistons is fixed to the swash plate, so that rotation of the swash plate enables the hydraulic cylinders to perform a linear alternating movement in the hydraulic cylinders.

6. The braking system as claimed in claim 1, wherein the variably exhausting pump unit comprises a lever for applying an external force to said swash plate to thereby make the swash plate be slanted, a spring interposed between the body and the swash plate to apply an elastic force to the swash plate in a direction opposing to the lever, and a stopper disposed in front of a rear surface of the swash plate to limit a movement of the swash plate by the elastic force of the spring.

7. The braking system as claimed in claim 6, wherein the lever is connected to a piston in a cylinder installed at an outer surface of the body, so that the lever is operated by a linear alternating movement of the piston.

8. The braking system as claimed in claim 7, wherein the piston performs the linear alternating movement by the hydraulic pressure generated by the master cylinder.

9. The braking system as claimed in claim 1, further comprising hydraulic cylinders, and wherein, in the variably exhausting pump unit, a ring sensor and a sensor for sensing a sliding of the wheel are disposed respectively at exteriors of the hydraulic cylinders.

10. The braking system as claimed in claim 9, wherein the ring sensor and the sensor are connected to the electronic control unit and transmits electric signals corresponding to the sliding of the wheel to the electronic control unit.

11. The braking system as claimed in claim 1, wherein variably exhausting pump unit comprises a stepped motor disposed at an exterior of a body of the variably exhausting pump unit, the stepped motor being operated according to an electric signal from an electronic control unit.

12. The braking system as claimed in claim 11, wherein the stepped motor comprising a cam which is in a sliding contact with an end of a swash plate.

13. The braking system as claimed in claim 12, wherein said cam rotates by operation of the stepped motor, so as to make the swash plate be slanted.

14. A braking system of an automobile having a variably exhausting pump unit, the braking system comprising:

a brake pedal in the vicinity of a driver's seat;

a master cylinder for generating hydraulic pressure when a force applied to the brake pedal is received;

a variably exhausting pump unit for performing a pumping orperation by the master cylinder;

a control section for sensing a traveling state of the automobile and controlling same such that a proper braking force is applied to a wheel of the automobile, said control section comprising an electric control unit for determining a slip of the wheel and giving an order, and a solenoid valve for blocking and bypassing oil exhausted from the variably exhausting pump unit according to the order from the electronic control unit; and a flow control valve for controlling the hydraulic pressure transferred from the varialby exhausting pump unit so as to apply a reverse torque to the variably exhausting pump unit, thereby braking the wheel of the automobile.

* * * * *